United States Patent
Elgarhy et al.

(10) Patent No.: US 7,413,631 B2
(45) Date of Patent: Aug. 19, 2008

(54) OPACIFYING COMPOSITION FOR PAPER OR PAPERBOARD, PROCESSES USING SAME AND PAPER OR PAPERBOARD PRODUCED THEREFROM

(75) Inventors: Yassin Elgarhy, Chomedey (CA); Gaston Caron, St-Eustache (CA); Alexandre de Laryssa, St-Bruno (CA)

(73) Assignee: Tri-Tex Co. Inc., St-Eustache, Quebec (CA)

( * ) Notice: Subject to any disclaimer, the term of this patent is extended or adjusted under 35 U.S.C. 154(b) by 434 days.

(21) Appl. No.: 11/132,246

(22) Filed: May 19, 2005

(65) Prior Publication Data

US 2006/0260776 A1 Nov. 23, 2006

(51) Int. Cl.
*D21F 11/00* (2006.01)

(52) U.S. Cl. ............... 162/158; 162/164.3; 162/164.4; 162/162; 162/179

(58) Field of Classification Search .............. 162/158, 162/164.3, 164.4, 162, 179
See application file for complete search history.

(56) References Cited

U.S. PATENT DOCUMENTS

| | | | |
|---|---|---|---|
| 2,142,986 A | 1/1939 | Arnold, Jr. | |
| 2,772,967 A | 12/1956 | Padbury et al. | |
| 3,096,232 A | 7/1963 | Chapman | |
| 3,951,853 A * | 4/1976 | Suwala | 516/123 |
| 4,225,456 A * | 9/1980 | Schmidt et al. | 516/121 |
| 5,292,363 A | 3/1994 | Hutcheson | |
| 5,296,024 A | 3/1994 | Hutcheson | |
| 5,393,334 A | 2/1995 | Hutcheson | |
| 5,472,486 A | 12/1995 | Dragner et al. | |
| 5,478,387 A | 12/1995 | Dragner et al. | |
| 5,488,139 A | 1/1996 | Dragner et al. | |
| 5,492,600 A | 2/1996 | Dragner et al. | |
| 5,494,555 A | 2/1996 | Dragner et al. | |
| 5,498,315 A | 3/1996 | Dragner et al. | |
| 5,667,638 A | 9/1997 | Dragner et al. | |
| 6,432,269 B1 | 8/2002 | Dragner | |

\* cited by examiner

*Primary Examiner*—Mark Halpern
(74) *Attorney, Agent, or Firm*—Ogilvy Renault LLP

(57) ABSTRACT

An agent for enhancing brightness and opaqueness in paperboard comprises a reaction product selected from the groups consisting of:

A) an amide reaction product of a $C_{12}$-$C_{22}$ fatty acid, condensed with an amine selected from monoalkanol amines, dialkanol amines or diethylene triamine or a mixture thereof.

B) an amide reaction product of a triglyceride of a $C_{12}$-$C_{22}$ fatty acid condensed with an amine selected from monoalkanol amine, dialkanol amine, or diethylene triamine or a mixture thereof.

C) an amide reaction product of an ester of a $C_{12}$-$C_{22}$ fatty acid condensed with an amine selected from monoalkanol lower alkyl amine, dialkanol amine, diethylene triamine or a mixture thereof; and D) an ester reaction of a $C_{12}$-$C_{22}$ fatty acid condensed with an alcohol selected from glycerine, ethylene glycol or propylene glycol.

17 Claims, No Drawings

OPACIFYING COMPOSITION FOR PAPER OR PAPERBOARD, PROCESSES USING SAME AND PAPER OR PAPERBOARD PRODUCED THEREFROM

FIELD OF THE INVENTION

This invention relates to a composition for use in making paper or paperboard; and a process of making paper or paperboard employing the composition, especially to add opaqueness to the paper, and a paper or paperboard produced using the composition.

BACKGROUND OF THE INVENTION

In paper and paperboard manufacture, sheet formation is generally obtained on wire webs in a wet end from pulp slurry and is followed by the gradual removal of moisture in a press section and drier section. A calender section follows the drier section with the purpose of obtaining a desired finish (e.g. smoothness, thickness, gloss).

Despite the real advantages of using mechanical action to impart certain characteristics to the sheet, these advantages are limited. Complementary solutions for improving even further certain paper or paperboard characteristics can be applied internally in the wet end or externally with size-presses or coaters when these are available. These solutions are related to the use of fillers and functional additives.

Fillers are generally white pigments that can be divided in two major categories:
a) regular fillers having wide application and cost lower than that of cellulosic fiber, e.g. kaolin clay, ground calcium carbonate and precipitated calcium carbonate;
b) specialized fillers having usually lower volume applications and costs sometimes comparable with or even higher than cellulosic fiber; Some examples are: anatase titanium dioxide, rutile titanium dioxide, composite pigments, e.g. clay and titanium dioxide, PSS (precipitated synthetic silica—silica oxides and precipitated silicate—aluminum silicate), talc (industrial grade hydrated magnesium silicate), aluminum trihydrate, calcium sulfate, natural or precipitated barium sulfate, zinc oxide, zinc sulfur—surface treatments only, Satin White (calcium sulfo-aluminate complex)—surface treatments only, urea formaldehyde resin (organic pigment), plastic pigments (empty or full spheres)—surface treatments only.

The advantages brought by fillers in paper or paperboard manufacture are mostly related to cost reduction (except with some of the specialized fillers, especially titanium dioxide). The process disadvantages are however important and concern mostly wire, felt, doctor blade, refiners abrasion, machine deposits increase, increased Tinting dust, breaks related to sheet strength decrease and filler retention difficulties requiring retention program solutions.

On the other hand, the functional advantages (with respect to final product characteristic) brought by fillers are also important: optical properties (brightness and opacity) improvement, improved printability, better sheet formation, increased smoothness, improved dimensional stability. The functional disadvantages are mostly related to increased two sidedness, reduced rigidity, increased linting and decreased sheet strength.

As mentioned earlier improving the paper or paperboard characteristics beyond the mechanical limits of a paper or paperboard machine often requires the use of fillers for their functional advantages and the use of functional additives for even better results.

Examples of functional additives (which can improve the sheet characteristic) are dyes and optical brighteners, coating polymers, wet and dry strength resins, sizing agents, fluorocarbons and other specialty additives, while process additives (that improve the production process) are biocides, deposit-control agents, felt conditioners and cleaners, defoamers, and effluent treatments.

Sizing agents, opacifying agents, optical brighteners are important functional additives used to improve the sheet characteristics obtained with mechanical means and with filler use. Resistance to water penetration, better printing characteristics, increased opacity brightness and whiteness, increased bulk and caliper, better formation, were investigated and often obtained with one or several of these products. Some process improvements related to reduced abrasion, cost reduction, were also noticed in some cases.

Many compositions have been added to the slurry in an attempt to size the paper, i.e. render the paper water repellent. Most known sizes, such as those disclosed in U.S. Pat. No. 2,142,986 to Arnold, Jr. and U.S. Pat. No. 3,096,232 to Chapman, employ a type of wax. For example, Arnold Jr. discloses that an emulsion of wax in a solution of deacetylated chitin, paraffin waxes, Japan wax, carnauba wax, higher aliphatic alcohols, or synthetic waxes may be employed as the water-proofing agent in a sizing composition. A softening agent such as aliphatic alcohols containing 12 to 20 carbons is also present in the composition of Arnold, Jr. Chapman discloses the use of paraffin waxes or water-insoluble derivatives of resins for producing aqueous wax emulsions with cationic modified starches.

In U.S. Pat. Nos. 5,296,024 and 5,292,363 a papermaking composition is disclosed for enhancing opaqueness comprising the reaction product of a fatty acid and a diamine. Even if this composition is effective, there are still further improvements needed for strength of the paper, and coefficient of friction.

U.S. Pat. No. 2,772,967 Padbury et al shows a paper sized by adding thereto a salt of a high molecular weight composition prepared by reacting a dialkanolamine or trialkalonamine with a long chain fatty acid. The salt is diluated with water to form a dispersion containing a 5% concentration of sizing agent before being applied to the cellulosic fibers. Apparently, such a dilution of strength was necessary heretofore because until the present invention, preparation of the stearamides which would allow the composition to remain pourable at concentration greater than 5% was unknown. Without the ability to remain in an emulsion and, hence, be poured, concentration of stearamides approaching those disclosed therein had apparently not been possible for use on pulp fibers. An important feature also disclosed by the patent is that the salts are cationic and are, therefore, absorbed by the anionic cellulosic fibers.

Numerous sizing agents are known. Generally, the known sizes are cationic materials. Although the sizes' cationic nature increases their absorption by the fibers to which they are applied, their cationic nature generally prevents them from being used to the full extent possible in connection with a brightener and opacifying agent. It is well known in the art that although cationic materials often increase sizing, they have the disadvantage that they reduce the brightness of the material to which they are applied. The use of cationic sizes in the paper industry reduces the quality of the paper made therefrom. Because the addition of cationic sizing agents to paper generally reduces the brightness thereof, cationic sizes have not been preferred as a size for paper, and in particular, as a size for paper made from recycled pulp which often lacks the inherent brightness of paper made from virgin pulp.

Although the prior art shows agents for sizing paper and agents for increasing the brightness and opaqueness of paper, the particular features of the present invention are absent from prior art. The prior art is generally deficient in affording a composition for use in a papermaking process that has the ability to provide sizing to paper without reducing brightness or opacity.

The different US patents related to U.S. Pat. No. 5,296,024 indicate that the resulting amide of the diamine, which forms the cationic softener base, is the fatty acid monoamide or the diamide or a mixture thereof.

It is further indicated that the diamides are preferred to the monoamide and it is indicated that the diamides are more active cationic bases, and have stronger affinity for the cellulosic fibers to which they are absorbed (U.S. Pat. No. 5,296, 024).

In this instance of a monoamide, however, the monoamide is the monoamide of a diamine. U.S. Pat. No. 5,488,139 describes an opacifier which is a reaction product of an alkanol amine and a dimerized acid, wherein the diamine (aminoethylethanol amine) is preferred, in this atent, the principal reactant with the amine is a dimerized acid.

U.S. Pat. No. 2,772,967 describes a size produced by reaction between a fatty acid and water soluble dialkanol amine or trialkanol amine. Thus, the reactants in the patent are a fatty acid and a monoamine. In this patent, however, the objective appears to be to perform an esterification reaction to produce esters between the fatty acid and the alcohol groups rather than amides between the fatty acid groups and the amine group.

U.S. Pat. No. 2,772,967 refers only to an esterification product as a sizing agent and not as an opacifier.

U.S. Pat. No. 5,296,024 indicates that concentrations greater than 5% were not possible with the sizing agents made by esterification mentioned in U.S. Pat. No. 2,772,967.

SUMMARY OF THE INVENTION

The present invention, however, overcomes the shortcomings of the prior art in that a composition is disclosed herein for simultaneously increasing the brightness, opacity, and sizing of paper or paperboard made from a pulp slurry of cellulose fibers containing the composition.

It is an object of the present invention to provide a composition that adds opacity to paper or paperboard to which it is added.

It is another object of the present invention to provide a composition for adding to a pulp slurry of cellulosic fibers to enhance opacity without adversely affecting other properties.

It is another object of the present invention to provide a process wherein a composition is added to recycled or virgin pulp of cellulosic fibers to form a paper or paperboard having desirable physical characteristics.

Still another object of the present invention is to provide a process for adding a composition to pulp slurry of cellulosic fibers in the papermaking process that will result in a paper or paperboard having enhanced opacity.

Another object of the present invention is to provide a paper or paperboard having the desirable characteristic of enhanced opacity.

Another object is to provide a paper making stock.

In one aspect of the invention, there is provided a composition for adding to a pulp slurry of cellulosic fibers for paper or paperboard manufacture, enhancing brightness, and opaqueness in paper or paperboard produced from the slurry wherein said composition comprises as a brightening and opacifying agent an additive comprising a reaction product selected from the group consisting of:

A) an amide reaction product of a $C_{12}$-$C_{22}$ fatty acid, condensed with an amine selected from monoalkanol amines, dialkanol amines or diethylene triamine or a mixture thereof;

B) an amide reaction product of a triglyceride of a $C_{12}$-$C_{22}$ fatty acid condensed with an amine selected from monoalkanol amine, dialkanol amine, or diethylene triamine or a mixture thereof;

C) an amide reaction product of an ester of a $C_{12}$-$C_{22}$ fatty acid condensed with an amine selected from monoalkanol lower alkyl amine, dialkanol amine, diethylene triamine or a mixture thereof; and D) an ester reaction product of a $C_{12}$-$C_{22}$ fatty acid condensed with an alcohol selected from glycerine, ethylene glycol or propylene glycol.

In another aspect of the invention, there is provided a paper making stock comprising a pulp slurry of cellulosic fibers, and a brightness and opacifying agent, said agent being an additive of the invention as defined hereinbefore.

In still another aspect of the invention, there is provided a method of producing paper or paperboard comprising the steps of:

a) providing a pulp slurry of cellulosic fibers, b) adding to said slurry a composition of a brightening and opacifying agent, said agent being an additive of the invention as defined hereinbefore, and c) forming paper or paperboard from the slurry.

In yet another aspect of the invention, there is provided a paper or paperboard of a composition comprising cellulosic fibers and a brightening and opacifying agent, the agent being an additive of the invention as defined hereinbefore.

In general, the present invention is directed to a composition used as an additive in a pulp slurry of cellulosic fibers from which paper or paperboard is formed, the process of making paper or paperboard from the additive-containing slurry, and the paper made according to that process.

In one embodiment, the composition is the reaction product of a fatty acid and a monoamine, for example, diethanolamine.

In another embodiment, the composition is the reaction product of a fatty acid with glycerine, ethylene glycol or propylene glycol.

DETAILED DESCRIPTION OF THE INVENTION

The reaction product or additive of the invention, which functions as a brightness and opacifying agent, may be selected from four related classes as identified above.

These classes employ the reaction product of a fatty acid or a triglyceride or lower alkyl ester of a fatty acid and a monoalkanol amine, a dialkanol amine or diethylene triamine, or mixtures of two or more thereof, in which case the additive is an amide; or a fatty acid and an alcohol, namely glycerine, ethylene glycol or propylene glycol, or a mixture of two or more thereof, in which case, the additive is an ester.

The fatty acid is typically one having 12 to 22 carbon atoms; but where mixtures of fatty acids are employed, may include fatty acids of at least 6 carbon atoms; especially stearic acid, fatty acid mixtures derived from tallow oil containing stearic, oleic and palmitic acids; and fatty acid mixtures derived from coconut oil, containg lauric acid, myristic acid, oleic acid, palmitic acid and capric acid.

The monoalkanol amines and dialkanol amines are typically those containing alkyl moieties of 1 to 6, preferably 2 to 4 carbon atoms.

The lower alkyl esters employed are those in which the lower alkyl moiety has 1 to 6, preferably 1 to 4 carbon atoms, with methyl being especially preferred.

The reaction product of this invention is usually added to bleached wood pulp or recycled paper pulp.

The reaction product of this invention can be added alone or in conjunction with other sizing agents, brighteners and opacifying agents.

The reaction product of this invention can be added to any pulp slurry or recycled pulp.

The amount of the reaction products and the other components added to the pulp slurry depends on the type of pulp slurry to which the reaction product is added.

The reaction product of this invention provides an increase in opacity to the paper or paperboard and provides an improved coefficient of friction.

The additive or reaction product may be employed in conjunction with a surfactant. The surfactant may form a composition with the additive for addition to the pulp slurry, or the surfactant may be added separately.

Typically, the additive is dispersed in water for addition to the pulp slurry and typically is added in a dry amount of 0.05% to 1%, preferably 0.1% to 0.3%, by weight, based on the oven dry weight of the pulp fibers. The weight basis is a dry basis.

The dispersion typically contains 5 to 15%, and preferably about 10%, by weight of the additive.

The surfactant, when employed, is typically employed in an amount of at least 0.005% by weight, based on the oven dry weight of the pulp fibers.

Suitable surfactants are ethoxylated surfactants, for example, ethoxylated alkanols.

The additive is typically added to the pulp slurry downstream of the bleaching stage of pulp production and is added alone or in conjunction with other brightness opacifying agents and papermaking additives, for example the surfactants, viscosity control agents, pH adjusters and defoamers.

The reaction products are more efficient and more effective even at lower concentration than an opacifying agent based on a diamide of a fatty acid and a diamine such as aminoethylethanol amine.

The amines that are useful in this invention, include for example monoalkanol amines, dialkanol amines and diethylene triamine, or mixtures thereof.

The fatty acids that are useful in this invention include $C_{12}$-$C_{22}$ fatty acids, the triglycerides are triglycerides of $C_{12}$-$C_{22}$ fatty acids, and the lower alkyl esters, especially methyl esters, are estes of $C_{12}$-$C_{22}$ fatty acids.

The compositions of this invention provide improved opacity to the treated paper or paperboard.

The invention is further illustrated by reference to the Examples.

EXAMPLES

Example 1

In a three neck round flask with an agitator and condenser, 350 g of stearic acid was added and melted. At 80° C., 150 g of diethanolamine was added slowly under nitrogen purge. The blend was heated at 180° C. for 8 hours under atmospheric pressure, 25 g of water was distilled off. After the vacuum was applied at 110 mn Hg for 1 hour and slowly decreased at 10 mn Hg for an extra hour to complete the reaction. The vacuum was broken with nitrogen. The acid value was below 10.

The product was cooled at room temperature.

An amount of 10 parts of above product and 1% of surfactant (ethoxylated alkanol) was added to 90 parts of water at 70° C. The pH was adjusted to 4 with acetic acid and the blend was mixed until homogeneous after the blend was cooled at room temperature.

Example 2

In a three neck round flask with an agitator and condenser, 350 g of stearic acid was added and melted. At 80° C., 60 g of glycerine was added and 0.4 g of methane sulfonic acid was added. The blend was heated at 210° C. for 8 hours. 23.6 g of water was distilled off. The blend was cooled at room temperature. The acid value was below 10.

An amount of 10 parts of above product was added to 90 parts of water at 70° C. The blend was mixed until homogeneous after which the blend was cooled to room temperature.

Laboratory testing conditions for examples 3, 4, 5 and 6.

Laboratory brightness, opacity and paper aging property tests were performed with the following materials and methods:

Pulp Preparation:

Water deionized at pH 7.0

Furnish:

400 g a.d. pulp: 10% deinked market pulp (40 g), 25% Softwood Kraft (100 g a.d.), 65% Hardwood Kraft (260 g a.d.).

Additives:

Standard opacifier (amide of fatty acid and diamine), New opacifiers (examples 1 and 2), PCC (without dispersant), $TiO_2$ (anatase), anionic PAM retention aid Apparatus for Pulp Preparation:

Beater with controlled bedplate (Pile Valley Iron Works)

British disintegrator

Canadian standard freeness tester 150 microns mesh

Hotplate (Termolyne Cimarec 2™)

pH meter (VWR scientific model 8000)

Thermometer (Fisherbrand)

Caframo stirrer RZR50™

1000 ml beaker

In all trials (control/standard product/new products) the pulp treatments were made as described below:

1) In a first stage refining was performed for the entire 400 g a.d. of pulp according to TAPPI 200 om-85 to a freeness of 300 ml CSF. Following the refining, pulp consistency was adjusted to 3% by filtration through a 150 micron mesh.
2) In the second stage 30 g a.d./trial of fibre (1000 g pulp) were heated and maintained at 55° C. for 20 minutes with opacifier additions or with no opacifier additions (control)

in the 1000 ml beaker on the hotplate, while stirring at 300 rpm. All the opacifier additions were made at 0.2% dry/a.d. fibre in examples 3 and 4 and at 0.4% in example 5.
3) In the third stage 15% PCC (4.5 g dry) or 15% PCC (4.5 g dry) and 15% $TiO_2$ (4.5 g dry) addition was followed by 10 minutes of stirring while maintaining 55° C. pulp temperature.
4) In the fourth stage the heating was stopped and the pulp was diluted to 1% with the addition of 2000 g deionized room temperature water, followed by 0.1% (0.03 g dry) anionic PAM addition and 2 minutes stirring at 200 rpm.

In example 5 handsheet preparation was made according to TAPPI 218 om-83 without a dispersion stage, with conditioning (without preconditioning) according to TAPPI 402 om-88 for 5 hours at 23° C. and 51% RH.

In examples 4, 5 and 6, TAPPI 218 was slightly modified by reusing three times the white water resulting from sheet formation and retaining for testing only each fourth sheet. The other conditions were identical to example 3.

In example 6 the aging properties of treated pulp were tested according to TAPPI 453 pm-85.

Handsheet printing opacity (ISO standard 2471) and ISO brightness testing were made in the same temperature and humidity conditions after 5 hours from the handsheet preparation on a Technibrite Micro TB-1C™.

Example 3

Laboratory testing without white water recirculation and without pigment addition showed the following results:

| Trial | Additive | ISO opacity |
|---|---|---|
| 1 | Control | 76.75 |
| 2 | Amide of fatty acid and diamine | 77.44 |
| 3 | Example 1 | 77.52 |
| 4 | Example 2 | 77.48 |

Example 4

Laboratory testing with white water recirculation and PCC addition showed the following results:

| Trial | Additive | ISO opacity |
|---|---|---|
| 1 | Control | 82.57 |
| 2 | Amide of fatty acid and diamine | 83.67 |
| 3 | Example 1 | 83.77 |
| 4 | Example 2 | 83.79 |

Example 5

Laboratory testing with white water recirculation, PCC and $TiO_2$ addition showed the following results:

| Trial | Additive | ISO opacity | ISO brightness | Product cationic demand (μeg/l) |
|---|---|---|---|---|
| 1 | Control | 91.69 | 88.17 | 0 |
| 2 | Amide of fatty acid and diamine | 91.99 | 88.26 | 27200 |
| 3 | Example 1 | 92.72 | 89.32 | 5600 |
| 4 | Example 2 | 92.68 | 88.74 | 0 |

Example 6

Laboratory testing with white water recirculation, PCC and $TiO_2$ addition showed the following paper aging results (ISO Brightness):

| Fatty acid and diamine | Example 1 | |
|---|---|---|
| 88.80 | 88.94 | 24 hours |
| 88.84 | 88.93 | 24 hours |
| 88.79 | 88.90 | 24 hours |
| 88.82 | 88.94 | 24 hours |
| 88.82 | 88.92 | 24 hours |
| 86.35 | 86.68 | 48 hours |
| 86.36 | 86.66 | 48 hours |
| 86.35 | 86.62 | 48 hours |
| 86.32 | 86.63 | 48 hours |
| 86.30 | 86.66 | 48 hours |
| 84.60 | 85.46 | 72 hours |
| 84.62 | 85.43 | 72 hours |
| 84.67 | 85.41 | 72 hours |
| 84.59 | 85.44 | 72 hours |
| 84.70 | 85.44 | 72 hours |
| 82.25 | 83.20 | 144 hours |
| 82.25 | 83.21 | 144 hours |
| 82.20 | 83.21 | 144 hours |
| 82.24 | 83.20 | 144 hours |
| 82.20 | 83.25 | 144 hours |

Couples of samples 1, 2, 3, 4, 5—were tested after 24 hours

Couples of samples 6, 7, 8, 9, 10—were tested after 48 hours

Couples of samples 11, 12, 13, 14, 15—were tested after 72 hours

Couples of samples 16, 17, 18, 19, 20—were tested after 144 hours

Statistical significance for the five samples at 144 hours:

$XA^-$=arithmetic mean brightness obtained with example 1=83.22

$XB^-$=arithmetic mean brightness obtained with amide of fatty acid and diamine Reactopaque 100=82.23

SA=standard deviation obtained with example 1=0.025884

SB=standard deviation obtained with fatty acid and diamine=0.025884

Na=number of test specimens obtained with example 1=5

Nb=number of test specimens obtained with fatty acid and diamine=5

SP=pooled value for standard deviation=$\{(Na-1)SA^2+(Nb-1)SB^2\}/(Na+Nb-2)$=0.0066998

α=significance level=1−degree of confidence=1−99.5%=0.005 df=degrees of freedom=Na+Nb−2=8 t for these α and df in the t distribution table is 5.041 u=test criterion for for detecting a difference at 99.5% confidence=t SP(Na+Nb)/Na    (5)

Nb=0.014

XA⁻−XB⁻=0.99>0.014=u

Therefore, it can be said with more than 99.5% confidence that the example 1 is affecting less the aging properties of the treated sheet than fattty acid and diamine.

CONCLUSION

The trials demonstrate advantages with respect to opacity, brightness and paper aging advantages for additives of the invention derived from a fatty acid and a monoamine and for the ester additive of Example 2, as compared to the control and the prior additive derived from a fatty acid and a diamine, in the context of using fillers or not, without or with white water recirculation. The results in Example 6 show that the additive of Example 1 is superior to the amide of the diamine with respect to brightness, with aging.

The invention claimed is:

1. A papermaking stock comprising a pulp slurry of cellulosic fibers, and a brightness and opacifying agent, said agent being an additive which is a reaction product selected from the group consisting of reaction products formed from:
    A) an amide reaction a product of $C_{12}$-$C_{22}$ fatty acid, condensed with an amine selected from monoalkanol amines, dialkanol amines or diethylene triamine or a mixture thereof;
    B) an amide reaction product of a triglyceride of a $C_{12}$-$C_{22}$ fatty acid condensed with an amine selected from monoalkanol amine, dialkanol amine, or diethylene triamine or a mixture thereof;
    C) an amide reaction product of an ester of a $C_{12}$-$C_{22}$ fatty acid condensed with an amine selected from monoalkanol lower alkyl amine, dialkanol amine, diethylene triamine or a mixture thereof; and
    D) an ester reaction product of a $C_{12}$-$C_{22}$ fatty acid condensed with an alcohol selected from glycerine, ethylene glycol or propylene glycol.

2. The papermaking stock according to claim 1, wherein the fatty acid is stearic acid.

3. The papermaking stock of claim 1, further comprising a surfactant.

4. The papermaking stock according to claim 3, wherein said surfactant is present in an amount of at least about 0.005% by weight, based on the oven dry weight of fibers.

5. The papermaking stock according to claim 3, wherein said surfactant is an ethoxylated surfactant.

6. A method of producing paper or paperboard comprising the steps of:
    i) providing a pulp slurry of cellulosic fibers,
    ii) adding to said slurry a composition of a brightening and opacifying agent, said agent being an additive which is a reaction product formed from the group consisting of:
        A) an amide reaction product of a $C_{12}$-$C_{22}$ fatty acid, condensed with an amine selected from monoalkanol amines, dialkanol amines or diethylene triamine or a mixture thereof;
        B) an amide reaction product of a triglyceride, of a $C_{12}$-$C_{22}$ fatty acid condensed with an amine selected from monoalkanol amine, dialkanol amine, or diethylene triamine or a mixture thereof;
        C) an amide reaction, product of an ester of a $C_{12}$-$C_{22}$ fatty acid condensed with an amine selected from monoalkanol lower alkyl amine, dialkanol amine, diethylene triamine or a mixture thereof; and
        D) an ester reaction product of a $C_{12}$-$C_{22}$ fatty acid condensed with an alcohol selected from glycerine, ethylene glycol or propylene glycol; and
    iii) forming paper or paperboard from said slurry.

7. A method according to claim 6, wherein said additive is reaction product A).

8. A method according to claim 6, wherein said additive is reaction product B).

9. A method according to claim 6, wherein said additive is reaction product C).

10. A method according to claim 6, wherein said additive is reaction product D).

11. A method according to claim 6, further comprising adding a surfactant to said slurry.

12. The method according to claim 11, wherein said surfactant is added in an amount of at least 0.1% by weight, based on the oven dry weight of fibers.

13. The method according to claim 6, further comprising a step of adding filler to said slurry.

14. The method according to claim 6, wherein said additive is added to said slurry in an amount, on a dry basis, of 0.05 to 1%, by weight, based on the oven dry weight of pulp fibers.

15. A paper or paperboard of a composition comprising cellulosic fibers and a brightening and opacifying agent, said agent being an additive which is a reaction product selected from the group consisting of reaction products formed from:
    A) an amide reaction product of a $C_{12}$-$C_{22}$ fatty acid, condensed with an amine selected from monoalkanol amines, dialkanol amines or diethylene triamine or a mixture thereof;
    B) an amide reaction product of a triglyceride of a $C_{12}$-$C_{22}$ fatty acid condensed with an amine selected from monoalkanol amine, dialkanol amine, or diethylene triamine or a mixture thereof;
    C) an amide reaction product of an ester of a $C_{12}$-$C_{22}$ fatty acid condensed with an amine selected from monoalkanol lower alkyl amine, dialkanol amine, diethylene triamine or a mixture thereof; and
    D) an ester reaction product of a $C_{12}$-$C_{22}$ fatty acid condensed with an alcohol selected from glycerine, ethylene glycol or propylene glycol.

16. The paper or paperboard according to claim 15, wherein said composition further comprises a surfactant.

17. The paper or paperboard composition according to claim 15, wherein said composition further comprises filler.

* * * * *